March 12, 1963

A. M. LEVINE 3,080,816

COOLING SYSTEM

Filed March 31, 1958

Fig.2

Fig.1

Inventor
ARNOLD M. LEVINE

By *(signature)*
Attorney

3,080,816
Patented Mar. 12, 1963

3,080,816
COOLING SYSTEM
Arnold M. Levine, Oradell, N.J., assignor to International Telephone and Telegraph Corporation, Nutley, N.J., a corporation of Maryland
Filed Mar. 31, 1958, Ser. No. 725,440
2 Claims. (Cl. 102—50)

This invention relates to a cooling system and more particularly to a cooling system for the radomes of infrared detection devices used on airborne vehicles.

As missile and aircraft speeds increase, the requirements placed upon defensive missiles call for even greater speeds well above the speed of sound. These higher velocities cause the nose area of airborne devices to become highly heated bodies. In the case of missiles, or aircraft, carrying infrared detection devices, if the frontal area, behind which these devices are mounted, becomes too hot, then the ability to detect and track by means of these infrared devices is greatly diminished. This is due to the infrared cell trying to look through a "hot" window or radome. Cooling the window in the conventional fixed radome of an aircraft becomes a tremendous problem because of the power exerted by the missile system creating the heat. Guided missiles employing infrared guidance and flying at speeds greater than Mach 2.0 develop extremely high temperatures at the surface of the radome or spherical dome. Since for a given flight velocity the time of flight is one of the prime factors governing whether equilibrium temperatures have been attained at the surface of the dome, means of cooling the infrared dome must be employed if the range of infrared guided vehicles is to be increased. For example, the Sidewinder Missile when accelerated from Mach 1 to 3 in two seconds develops a stagnation temperature of only 200° F. at the end of eight seconds flight time. Should the time of flight, however, be increased to greater than one minute, equilibrium will be obtained and a surface temperature of 633° F. can be realized at the stagnation point. The importance of adequately cooling the dome to hold the temperature thereon to approximately 212° F. can be appreciated.

It is, therefore, an object of this invention to provide a simple and practical means to cool the radome of an infrared detecting device in airborne vehicles.

It is a further object to provide a cooling system which requires a minimum of moving parts and does not need pumping means for its operation.

Another object is to provide a cooling system which requires a minimum amount of coolant fluid sufficient for a predetermined time of operation.

A feature of this invention is a cooling system for cooling a member, a portion of which is exposed to heat producing conditions, and comprises a body of coolant fluid and means disposing the fluid in heat exchange relation with an unexposed portion of the member. Means are provided to move the exposed portion into heat exchange relation with the coolant fluid and to move the unexposed portion into the position of exposure to the heat producing conditions.

Another feature of this invention is a cooling system for cooling a member, such as a sphere formed of material capable of transmitting infrared rays, a portion of which is in a position exposed to heat producing conditions and which encloses an infrared detecting device, thus shielding the infrared detecting device from the heat producing conditions. A body of coolant fluid is disposed in heat exchange relation with an unexposed portion of the sphere and means are provided to move the exposed portion into heat exchange relation with the fluid and to move the unexposed portion into the position subject to the heat producing condition. The sphere is thus moved, preferably in a rotative manner, from the exposed position where it acquires heat into heat exchange relation with the fluid to thereby transfer most of the acquired heat to the fluid.

A further feature is that the coolant fluid is stored in a tank and the unexposed portion of the sphere is disposed within the tank and is continually rotated about an axis of the sphere thus moving the heated exposed portion into the tank in contact with the fluid and moving the cooled unexposed portion out of the tank and subject to the heat producing conditions.

Still another feature is that the sphere is formed of at least two substantially equal parts and the tank is made with a removable cover so that the component parts of the sphere can be inserted through the uncovered end and maneuvered to the opposite end of the tank for assembly into the sphere and for rotation thereat.

The above-mentioned and other features and objects of this invention will become more apparent by reference to the following description taken in conjunction with the accompanying drawings, in which:

FIG. 1 is a longitudinal cross-sectional view of the nose of an aircraft showing the cooling system of this invention; and FIG. 2 is a cross-sectional view of FIG. 1 along the lines of 2—2 of FIG. 1.

Referring now to FIGS. 1 and 2, there is shown the nose shell 1 of an aircraft having a front aperture at 2. Disposed in this aperture and partially protruding therefrom is a sphere 3 made of a material capable of transmitting infrared radiation. Attached to the shell 1 is a member 4 of round cross-sectional tubing which serves to support an infrared detection device 5 and the sphere 3. The member 4 has a circular portion 4a which is concentric with the inner surface of the sphere 3 and permits the sphere to move freely about it. The sphere 3 consists of two hemispherical domes 6 and 7 which are cemented together along the circular seam 8 extending around the periphery of the sphere 3. At the two poles of the sphere 3 are extended cylindrical portions 9 and 10 which have counterbored holes 11 and 12 adapted to receive ball bearings 13 and 14, preferably of the split ball bearing type. The inner races of the ball bearings 13 and 14 are disposed about straight portions 15 and 16 of the tubular member 4, which are in axial alignment. This axis serves as the rotational axis for the sphere 3. In back of the sphere 3 is a storage tank 17 comprising a cylindrical body 18 with a truncated cone front portion 19, the outer surface of which also serves as a portion of the nose aerodynamic surface of the aircraft. A circular groove 20 is cut adjacent the end of the front portion 19 to receive a circular seal 21, such as an O ring, preferably made of Teflon. The seal 21 provides a seal at the surface of the sphere 3 to prevent leakage between the exposed portion of the sphere and the portion disposed within the tank 17. At the rear of the tank 17 is a cover 22 which is attached by means of screws 23 to matching threaded holes in a flange 24 and with a gasket 25 serves to enclose the rear end of the tank 17. A hole 26 is provided whereby coolant fluid can be poured into the tank 17 and is closed by a plug 26a. A motor 27 is coupled to a gear train 28 by means of a belt 29. A cap 30 made of the same material as the sphere is rigidly coupled to the gear train 28 and is cemented to the extended portion 10 of the sphere 3, thus enclosing the ball bearing 14 and permitting rotation of the sphere about the device 5. A similar cap 31 is cemented to the portion 9 and encloses the ball bearing 13.

The infrared device 5 is supported centrally of the sphere 3 by means of a straight tubular member 32 fastened to the member 4. The infrared device 5 comprises a center gimbal support 33 at the front portion of which is located an infrared cell 34. Two primary mirrors 35 are supported in opposed axial relation by means of a member 36. A secondary mirror 37 is supported by member 36 frontally of the infrared cell 34. The infrared rays radiate through the exposed portion of the sphere 3 and onto the mirrors 35 which reflect these rays towards the surface 38 of mirror 37, which in turn reflects them to the infrared cell 34. The electrical impulses set up in the cell 34 by the infrared rays are transmitted through leads 39 which lie within the members 32 and 4 and connect to the infrared electronic system of the aircraft. The construction of the tank 17 permits the assembly of the component hemispheres 6 and 7 of the sphere 3 from the rear of the tank. By removing the cover 22, the hemisphere 6 can be inserted and maneuvered to the front portion 19 of the tank 17 adjacent the seal 21 and snapped in place around the ball bearings 13 and 14. The other hemisphere 7 is then inserted around the ball bearings and cemented to its mating partner. The caps 30 and 31 are also made into symmetrical portions so that they can be manipulated in the same manner and are cemented to the raised portions 9 and 10 of the sphere 3. Seals 40 and 41 prevent leakage past the seams 42 and 43 and the ball bearings 13 and 14 into the interior of the sphere. The preferred material for the sphere 3 can be any crystalline material capable of transmitting infrared rays, such as fuse quartz or glass. The preferred cement can be epoxy resin. It is to be understood that the seam 8 which forms the boundaries of hemispheres 6 and 7 must be correctly machined to close tolerances to provide a watertight joint when cemented together and a smooth outer surface capable of moving past the seal 21 without cutting the seal and thereby allowing leakage of fluid past the seal.

If we assume a missile flying at 60,000 feet set altitude and at Mach 3.0 with the range of 200,000 yards, the time of flight would therefore be 3.44 minutes. The steady state heat transfer to the surface of a 7-inch diameter spherical dome being held at a constant surface temperature of 212° F. under these conditions is 5.43 B.t.u./sec. The temperature at the surface is maintained at approximately 212° F. by supplying the storage tank with 6.23 lbs. of ice water so that at the end of flight, 3.44 minutes, the heat that is dissipated from the surface of the sphere to the coolant will raise the temperature of the coolant to 212° F. Since the sphere is being rotated, the condition of substantially constant surface temperature can be assumed.

While I have described above the principles of my invention in connection with specific apparatus, it is to be clearly understood that this description is made only by way of example and not as a limitation to the scope of my invention as set forth in the objects thereof and in the accompanying claims.

I claim:
1. A cooling system for cooling the radome in the forward area of an airborne vehicle comprising a radome in the form of a sphere adapted to transmit infrared rays therethrough, an infrared detecting device, support means disposing said infrared detecting device within said sphere and disposing said sphere for rotation about said device, a storage tank containing coolant fluid, means disposing a first portion of said sphere in a position as one wall portion of said tank in heat exchange relation with said fluid while a second portion of said sphere protrudes from said tank in a position exposed to heat producing conditions generated by the friction of the passage of said vehicle through the atmosphere, means slidably sealing off said first portion of said sphere from said second portion to prevent leakage of fluid from said tank, means for rotating said sphere to continually interchange said first and second portions relative said exposed position and said heat exchange position.

2. A cooling system for cooling a radome in the forward area of an airborne vehicle comprising a radome in the form of a sphere, support means disposing said sphere for rotation, a storage tank containing coolant fluid, means disposing a first portion of said sphere in a position as one wall portion of said tank in heat exchange relation with said fluid while a second portion of said sphere protrudes from said tank in a position exposed to heat producing conditions generated by the friction of the passage of said vehicle through the atmosphere, means slidably sealing off said first portion of said sphere from said second portion to prevent leakage of fluid from said tank, and means for rotating said sphere to continuously interchange said first and second portion relative said exposed position and said heat exchange position.

References Cited in the file of this patent
UNITED STATES PATENTS

| | | |
|---|---|---|
| 2,308,541 | Raver | Jan. 19, 1943 |
| 2,565,063 | Briscoe et al. | Aug. 21, 1951 |
| 2,893,699 | Bubniak | July 7, 1959 |